United States Patent
Fushihara et al.

(10) Patent No.: US 6,825,272 B2
(45) Date of Patent: Nov. 30, 2004

(54) GOLF BALL

(75) Inventors: Kazuhisa Fushihara, Kobe (JP); Hiroaki Tanaka, Kobe (JP)

(73) Assignee: Sumitomo Rubber Industries Limited, Hyogo (JP)

( * ) Notice: Subject to any disclaimer, the term of this patent is extended or adjusted under 35 U.S.C. 154(b) by 34 days.

(21) Appl. No.: 10/234,324

(22) Filed: Sep. 5, 2002

(65) Prior Publication Data

US 2003/0100385 A1 May 29, 2003

(30) Foreign Application Priority Data

Sep. 5, 2001 (JP) ........................................ 2001-268926

(51) Int. Cl.$^7$ .............................................. A63B 37/12
(52) U.S. Cl. ................... 525/93; 525/54.21; 525/54.22; 525/94; 525/440; 525/528; 527/301; 106/31.69; 106/31.75; 473/371; 473/372; 473/378; 473/385
(58) Field of Search ........................... 525/54.21, 54.22, 525/93, 94, 440, 528; 527/301; 106/31.69, 31.75, 36.69; 473/371, 372, 378, 385

(56) References Cited

U.S. PATENT DOCUMENTS

| 4,095,994 A | * | 6/1978 | Crawford et al. ........... 106/431 |
| 5,000,458 A |   | 3/1991 | Proudfit |
| 5,160,536 A |   | 11/1992 | Harris et al. |
| 6,241,625 B1 | * | 6/2001 | Yokota et al. .............. 473/373 |
| 6,540,624 B1 | * | 4/2003 | Isogawa ..................... 473/371 |

FOREIGN PATENT DOCUMENTS

| AU | 199716549 | * | 10/1997 |
| GB | 2 254 792 A | | 10/1992 |
| JP | 8-182775 A | | 7/1996 |
| JP | 2000303012 | * | 10/2000 |
| JP | 2001164167 | * | 6/2001 |

* cited by examiner

*Primary Examiner*—David J. Buttner
(74) *Attorney, Agent, or Firm*—Birch, Stewart, Kolasch & Birch, LLP

(57) ABSTRACT

A golf ball which is excellent in durability, sufficient to be used in a golf practice range, wherein the golf ball includes a core, a cover covering the core, and a mark printed on the surface of the cover, wherein: the cover is formed from a mixture of an ionomer and an epoxy group-containing polymer and the mark is printed with an ink containing a pigment, an isocyanate compound, and a base resin which is curable with the isocyanate compound.

14 Claims, No Drawings

GOLF BALL

BACKGROUND OF THE INVENTION

1. Field of the Invention

The present invention relates to a golf ball for which high durability is required like a golf ball used in a golf driving range, and more particularly, to a golf ball having indicia of superior durability and that the indicia or mark printed on a golf ball will not peel off or wear out, even if the golf ball is subjected to repeated hitting or cleaning.

2. Description of the Related Art

In general, a golf ball is printed with marks such as brand names. A clear paint is applied on the entire surface of the golf ball so as to cover the mark printed thereon, thereby imparting a gloss to the golf ball as well as protecting the mark.

A multi-piece golf ball generally comprises a rubber core and a cover covering the rubber core. The multi-piece golf ball usually employs an ionomer cover, which is formed mainly from an ionomer, because of its excellence in its repulsion property and durability. An urethane paint is preferably used as the clear paint because urethane paint follows the deformation of the golf ball when the golf ball is hit.

Since adhesion between the ionomer cover and the urethane clear paint coating is poor, it is a general practice to interpose a primer layer, which exhibits good adhesion to both the cover and the clear paint, between the cover and the clear paint layer. According to this practice, the desired mark is printed on the primer layer, and then the clear paint is applied on the entire surface of the cover so as to cover the printed mark. Japanese unexamined patent publication No. H08-182775, for example, has proposed a golf ball for which a polyurethane primer paint is used. The polyurethane primer paint contains a polyol and a polyisocyanate so that the ratio between the amount of the hydroxyl group of the polyol and the isocyanate group of the polyisocyanate is adjusted to fall within a specific range. When the clear topcoat forming the surface layer of the golf ball peels off, the printed mark sometimes peels off together with the clear topcoat due to the adhesion therebetween. Particularly when the adhesion between the clear topcoat and the primer coat is enhanced excessively, both the primer coat and the mark printed thereon sometimes peel off together with the clear topcoat. For this reason, it is preferable not to enhance the adhesion to an excessive extent between the clear topcoat and the primer coat. Rather, it is desired that only the clear topcoat peels off and that the printed mark remains on the golf ball as it is. The golf ball on which the printed mark remains is worth using even if the topcoat peels off at the golf practice driving range where the golf ball is repeatedly hit, cleaned and reused.

In some cases, the primer coat is used to enhance the adhesion of the printed mark to the cover rather than to enhance the adhesion to the clear topcoat. In addition, it has been proposed that the primer coat is removed for the purpose of simplifying the manufacturing process by enhancing the adhesion of the mark to the cover. For example, Japanese Patent No. 3,102,817 has proposed a golf ball bearing a mark printed with an ink directly on an ionomer cover. The ink contains a nitrocellulose resin exhibiting a high adhesion to the ionomer cover as a major component. However, the durability of the mark printed with nitrocellulose ink is still insufficient to meet the level of golf ball which requires a considerably high durability such as a golf ball which is repeatedly hit, used and cleaned at a golf driving range.

The present invention has been achieved in view of the foregoing circumstances. Accordingly, it is an object of the present invention to provide a golf ball both bearing a mark which can be printed directly on the cover including an ionomer cover as a major component without the need of a primer coat and which exhibits excellent durability, particularly in peel resistance and wear resistance, to such a degree as to satisfy the requirements of severe usage like the repeated cleaning.

SUMMARY OF THE INVENTION

According to the present invention, there is provided a golf ball comprising a core, a cover covering the core, and a mark printed on a surface of the cover, wherein: the cover is formed from a mixture of an ionomer and an epoxy group-containing polymer; and the mark is printed with an ink comprising a pigment, an isocyanate compound, and a base resin which is curable with the isocyanate compound.

DETAILED DESCRIPTION OF THE PREFERRED EMBODIMENTS

The present invention will now be described in detail. The golf ball of the present invention includes a core, a cover covering the core, and a mark printed on a surface of the cover. Preferably, the golf ball further includes a clear coat film covering the mark and the entire surface of the cover in order to protect the mark and improve the appearance of the golf ball.

The core used in the present invention includes a wound core or a solid core without any particular limitation. Preferably, the core is a solid core comprising a vulcanized rubber body. Further, the core may be a single-layered or multi-layered vulcanized rubber body.

The vulcanized rubber body is preferably a crosslinked product of a rubber composition. The rubber composition comprises a diene rubber, an organic peroxide as a crosslinking initiator, and an $\alpha,\beta$-unsaturated carboxylic acid or a metal salt thereof as a co-crosslinking agent, or a combination of an $\alpha,\beta$-unsaturated carboxylic acid and a metal oxide such as zinc oxide.

Examples of the diene rubber are ethylene-propylene-diene terpolymer (EPDM), butadiene rubber (BR), isoprene rubber (IR), styrene-butadiene rubber (SBR), and acrylonitrile-butadiene rubber (NBR). Among them, a high cis-polybutadiene having cis-1,4 bond in a proportion of 90% or more is preferably used. Examples of the organic peroxide are dicumyl peroxide and 1,1-bis(t-butylperoxy)-3,3,5-trimethylcyclohexane.

The cover material for use in the present invention is formed from a composition comprising an ionomer and an epoxy group-containing polymer. The ionomer typically used for the cover of a two-piece golf ball is preferably used in view of its high strength and high elasticity. Typically preferred is a metal ion-neutralized copolymer of $\alpha$-olefin and $\alpha,\beta$-unsaturated carboxylic acid. Examples of metal ions for neutralizing the copolymer are monovalent metal ions such as sodium ion, potassium ion, and lithium ion; bivalent metal ions such as zinc ion, calcium ion, magnesium ion, copper ion, and manganese ion; and trivalent metal ions such as aluminum ion and neodymium ion. Among them, zinc ion is particularly preferable because the binding power of the cluster of metal ions is so high that a decrease in mechanical strength due to dispersion of crosslinked diene rubber particles is small.

Examples of specific ionomers are HIMILAN series products of MITSUI-DUPONT POLYCHEMICALS CO., LTD.

such as HIMILAN 1605 (a sodium ion-neutralized ethylene-methacrylic acid copolymer type ionomer resin), HIMILAN 1707 (a sodium ion-neutralized ethylene-methacrylic acid copolymer type ionomer resin), HIMILAN 1706 (a zinc ion-neutralized ethylene-methacrylic acid copolymer type ionomer resin), HIMILAN AM7315 (a zinc ion-neutralized ethylene-methacrylic acid copolymer type ionomer resin), HIMILAN AM7317 (a zinc ion-neutralized ethylene-methacrylic acid copolymer type ionomer resin), HIMILAN 1555 (a sodium ion-neutralized ethylene-methacrylic acid copolymer type ionomer resin), and HIMILAN 1557 (a zinc ion-neutralized ethylene-methacrylic acid copolymer type ionomer resin); IOTECH series products of Exxon Co. such as IOTECH 8000 (a sodium ion-neutralized ethylene-methacrylic acid copolymer type ionomer resin) and IOTECH 7010 (a zinc ion-neutralized ethylene-methacrylic acid copolymer type ionomer resin); and SURLYN series products of DUPONT CO. such as SURLYN 7930 (a lithium ion-neutralized ethylene-methacrylic acid copolymer type ionomer resin), SURLYN 9945 (a zinc ion-neutralized ethylene-methacrylic acid copolymer type ionomer resin), and SURLYN 8945 (a sodium ion-neutralized ethylene-methacrylic acid copolymer type ionomer resin).

The epoxy group-containing polymer may be any polymer having an epoxy group at any position of a molecular chain thereof. Preferably, the epoxy group-containing polymer is a thermoplastic elastomer of which the terminal double bond is epoxidized. The thermoplastic elastomer for use in the present invention is a block copolymer which comprises a combination of a polymer block serving as a hard segment of which molecular motion is restrained by the polymer block exhibiting a frozen or crystalline phase at temperatures lower than its melting point and a polymer block serving as a soft segment of which molecular motion is not restrained, and which has a double bond in a molecular chain thereof or at the terminal portion of the molecule.

Examples of specific thermoplastic elastomers are a block copolymer comprising a combination of polystyrene as a hard segment and a random copolymer block consisting of isoprene and butadiene, polyisoprene or polybutadiene as a soft segment; and a polystyrene elastomer, which is a hydrogenated product of the foregoing block copolymer.

The bond structure of the polymer block forming a hard segment (represented by "PH block") and the polymer block forming a soft segment (represented by "PS block") may include PH block-PS block type, PH block-PS block-PH block type, multi-block type represented by (PH block-PS block)$_n$, star configuration type, or the like without any particular limitation. Typically preferred is a block copolymer having a bond structure of the PH block-PS block-PH block type of which the terminal double bond is epoxidized. Specific examples of the preferred block copolymers are a block copolymer of an SIBS structure comprising a polystyrene block (hereinafter abbreviated as "S") and a random copolymer block of isoprene and butadiene (hereinafter abbreviated as "IB"), a block copolymer of an SBS structure comprising a polystyrene block and a polybutadiene block (hereinafter abbreviated as "B"), a block copolymer of an SEBS structure comprising a polystyrene block and a polymer block formed of an ethylene-butylene unit (hereinafter referred to as "EB") resulting from hydrogenation of double bonds of a polybutadiene block, a block copolymer of an SIS structure comprising a polystyrene block and a polyisoprene block (hereinafter abbreviated as "I"), a block copolymer of an SEPS structure comprising a polystyrene block and a polymer block formed of an ethylene-propylene unit (hereinafter referred to as "EP") resulting from hydrogenation of double bonds of a polyisoprene block, and modifications of these block copolymers. The styrene content of the styrene-type thermoplastic elastomer having any one of the structures described above is preferably not less than 1% by mass, more preferably not less than 5% by mass, much more preferably not less than 10% by mass. The upper limit of the styrene content is preferably 50% by mass, more preferably 40% by mass, much more preferably 30% by mass.

The epoxy group-containing polymer may further include, for example, a thermoplastic elastomer having a polybutadiene block or a polyisoprene block and at least one double bond of the polybutadiene block or the polyisoprene block is epoxydized, a thermoplastic elastomer having a random copolymer block consisting of isoprene and butadiene and at least one double bond of the random copolymer block is epoxydized, or a thermoplastic elastomer having a structure of polystyrene block-polybutadiene block-polystyrene block and at least one double bond of the polybutadiene block is epoxydized.

The epoxy group-containing polymer preferably has the epoxy group content of not less than 0.05% by mass, more preferably not less than 0.2% by mass. The upper limit of the epoxy group content is preferably 10% by mass, more preferably 5% by mass. The epoxy group-containing polymer preferably has the epoxy equivalent weight within a range of from 500 to 3000, more preferably from 800 to 2000. The ratio of the amount of the ionomer to the amount of the epoxy group-containing polymer in the cover material is preferably from 95:5 to 70:30 by mass.

The cover material used in the present invention preferably contains a white pigment in addition to the aforementioned resin components such as the ionomer resin and the epoxy group-containing polymer. The white pigment includes, for example, titanium oxide, zinc oxide or the like. Among them, titanium oxide is preferably used. The addition of the white pigment to the cover material enables to impart the weather-resistance to the resulting cover. Since the golf ball of the present invention does not have the primer coat, the cover of the golf ball is subjected to the exposure of ultraviolet ray and the like, when the clear coat film peels off. Therefore, it is preferable to add the white pigment to the cover in the present invention. The addition of the white pigment is important especially when the golf ball of the present invention is used in a golf driving range. This is because the golf ball is repeatedly cleaned and used in the golf practice driving range, even after the clear coat film peels off. The content of the white pigment in the cover material is preferably from 2% to 5% by mass with respect to the cover material. The cover material may further contain an ultraviolet absorber, fluorescent brightener and other additives where necessary.

In the present invention, the cover is formed by any one of the following methods using the aforementioned cover material. The method for forming the cover includes, for example, a method comprising the steps of: forming a pair of hemispherical cups from the cover material; placing the core into one hemispherical cup; mating the pair of hemispherical cups together and joining them to each other under the pressure to form the cover, a method comprising injection-molding the cover material so as to embrace the core, and other methods. If desired, the surface of the cover may be formed with dimples in the cover molding process. The cover preferably has, for example, without limitation, the thickness from 0.3 to 3.5 mm.

In the present invention, a mark is printed on the surface of the cover thus formed with an ink described below. Prior to printing the mark, the surface of the cover is preferably roughened with an abrasive by sand blasting, barrel-polishing or the like process. The rough surface improves the adhesion of the mark to the cover as well as to the adhesion of the clear topcoat to the cover.

The following description is directed to the ink for use in printing the mark. The ink used in the present invention comprises a pigment, an isocyanate compound, and a base resin which is curable with the isocyanate compound. Any conventional pigment can be used in the present invention without any particular limitation. Examples of the pigments are: black pigments such as carbon blacks including acetylene black, lamp black and aniline black; yellow pigments such as chrome yellow, zinc yellow, cadmium yellow, yellow oxide, mineral fast yellow, nickel-titanium yellow, Naples yellow, naphthol yellow S, Hansa yellow G, Hansa yellow 10G, benzidine yellow G, benzidine yellow GR, quinoline yellow lake, permanent yellow NCG and tartrazine lake; orange pigments such as chrome orange, molybdenum orange, permanent orange GTR, pyrazolone orange, vulcan orange, Indanthrene Brilliant Orange RK, benzidine orange G and Indanthrene Brilliant Orange GK; red pigments such as red oxide, cadmium red, red lead oxide, mercury sulfide-cadmium, permanent red 4R, lithol red, pyrazolone red, Watchung red calcium salt, lake red D, brilliant carmine 6B, eosin lake, rhodamine lake B, alizarin lake and brilliant carmine 3B; violet pigments such as manganese violet, fast violet B and methyl violet lake; blue pigments such as Prussian blue, cobalt blue, alkali blue lake, Victoria blue lake, phthalocyanine blue, metal-free phthalocyanine blue, partially chlorinated phthalocyanine blue, fast sky blue and Indanthrene blue BC; green pigments such as chrome green, chrome oxide, pigment green B, malachite green lake and Fanal yellow green G; and white pigments such as silica, zinc white, titanium oxide, antimony white, zinc sulfide baryte powder, barium carbonate, clay, talc and alumina white.

The content of the pigment in the ink can be determined depending on the depth of the color of the printed mark, the content of the pigment is preferably not less than 1% by mass, more preferably not less than 3% by mass. The upper limit of the pigment content is preferably 30% by mass, more preferably 25% by mass. If the pigment content is less than 1% by mass, a resulting mark exhibits a lowered chromaticity, whereas if the pigment content is more than 30% by mass, the adhesion of the ink to the cover is lowered.

The isocyanate compound is not limited, as long as it has at least two isocyanate groups. From the viewpoint of weather-resistance, non-yellowing polyisocyanates are preferred. Examples of the non-yellowing polyisocyanates are an aliphatic isocyanate such as hexamethylene diisocyanate (HMDI), a cyclo-aliphatic(alicyclic) isocyanate such as hydrogenated xylylene diisocyanate ($H_6XDI$), isophorone diisocyanate (IPDI) and hydrogenated diphenylmethane diisocyanate ($H_{12}MDI$), and an aromatic isocyanate such as xylylene diisocyanate (XDI) and tetramethylxylylene diisocyanate (TMXDI).

The isocyanate compound can not only serve as a curing agent with the base resin contained in the ink but also react with the epoxy group of the epoxy group-containing polymer contained in the cover material. Thus, it is possible to form the mark which exhibits the superior adhesion to the cover. Also, it is possible to provide the mark which exhibits such superior adhesion as to withstand the repeated cleaning even after the clear topcoat of the golf ball has peeled off. The content of the isocyanate compound in the ink is preferably within a range of from 1% to 30% by mass, more preferably from 2% to 25% by mass. It is sufficient to determine a suitable content of the isocyanate compound within this range depending on the amount of the base resin.

The base resin contained in the ink used in the present invention may be any resin, as long as the base resin is curable with the foregoing isocyanate compound. Specifically, the base resin is an epoxy group-containing resin, an alcoholic hydroxyl group-containing resin, or a mixture thereof.

Since the base resin has an epoxy group or an alcoholic hydroxyl group, it is curable with the isocyanate compound, and hence a mark having durability is formed. The term "mark having durability" used herein, means a mark that does not crack when repeatably struck by the golf club. Especially in the golf practice driving range, the golf ball continues to be used even after the clear coat film thereof has peeled off, the printed mark is subjected to the direct hitting. For this reason, high durability is required for the mark.

The epoxy group-containing resin is a resin having an epoxy group in a molecular chain thereof, usually at the terminal of a molecule thereof. Examples of the epoxy group-containing resins are a bisphenol A epoxy resin resulting from a reaction between bisphenol A and epichlorohydrin, a bisphenol F epoxy resin resulting from a reaction between bisphenol F and epichlorohydrin, bisphenol AD epoxy resin resulting from a reaction between bisphenol AD and epichlorohydrin, a phenol novolac epoxy resin resulting from a reaction between phenol novolac and epichlorohydrin, a cresol novolac epoxy resin resulting from a reaction between cresol novolac and epichlorohydrin, a cyclic aliphatic epoxy resin resulting from epoxidization of the double bond of a cyclohexene ring through oxidation, a glycidyl ester epoxy resin resulting from a reaction between carboxylic acid and epichlorohydrin, and glycidylamine epoxy resin resulting from a reaction between a primary or secondary amine and epichlorohydrin.

The alcoholic hydroxyl group-containing resin includes, for example, polyesterpolyol, polycarbonatepolyol, acrylpolyol or the like prepared by the introduction of an appropriate alcoholic hydroxyl group into or at the terminal of a macromolecular chain of a polyester resin, polycarbonate resin, acrylic copolymer or the like. A partially-nitrated nitrocellulose resin can be also used as the alcoholic hydroxyl group-containing resin. The partially-nitrated nitrocellulose resin is the nitrocellulose in which less than three, on average, of the three glucose residues as cellulose forming units are substituted.

The alcoholic hydroxyl group-containing resin can be cured by the reaction between the alcoholic hydroxyl group of the resin and the isocyanate compound. The ratio of the amount of the isocyanate compound to the amount of the base resin (isocyanate:base resin) in the ink used in the present invention is preferably within a range of from 1:0.5 to 1:4.5, although it depends on the kind of the base resin to be used, particularly on the content of the functional group of the base resin.

The ink used in the present invention may further contain a solvent in addition to the aforementioned essential ingredients (the pigment, the isocyanate compound and the base resin) where necessary.

Examples of the solvents are: aromatic hydrocarbons such as toluene and xylene; ester type solvents such as ethyl acetate and butyl acetate; ether type solvents such as dimethyl ether and diethyl ether; ketone solvents such as methyl ethyl ketone; and alcohol type solvents such as methanol, ethanol and isopropyl alcohol. The content of the solvent in the ink is preferably not less than 20% by mass, more preferably not less than 30% by mass. The upper limit of the content of the solvent is preferably 70% by mass, more preferably 60% by mass. If the content of the solvent is less than 20% by mass, it becomes hard to transfer the ink from a pad to the golf ball surface, thus resulting in a printed mark having a poor appearance with pinholes or the like. On the other hand, if the content of the solvent is more than 70% by mass, it takes a longer time to dry the mark after printing, resulting in the lowered productivity. Further, the excess content of the solvent causes the blur of the mark, or voids or pinholes of the mark due to the relatively decreased amounts of the resin and pigment. The ink may further contain an additive such as a flatting agent. The content of the flatting agent is preferably from 1 to 30 by mass %, more preferably from 5 to 20 by mass % in the ink.

The golf ball of the present invention bears a mark printed with the ink described above. The mark can be printed by a well-known printing method. For example, the mark printing method include a thermal transfer method comprising the steps of: providing a transfer sheet printed with a mark pattern formed of the aforementioned ink; and applying the transfer sheet onto the cover, followed by heating, and a pad printing method comprising the steps of: filling an engraved mark pattern of an intaglio with the aforementioned ink; applying a pad to the intaglio to allow the ink forming the mark pattern to adhere to the pad; and applying the pad onto the cover so that the ink forming the mark pattern is transferred to the cover surface. Generally, the mark pattern is dried at 30 to 50° C. for 1 to 12 hours. In the present invention, the pad printing method is preferably employed.

The mark is printed directly on the cover surface, thereby enhancing the productivity. Further, the mark which exhibits the superior adhesion directly to the cover without the primer coat can be formed by selecting a specific combination of the ink and the cover material.

In the mark thus printed, the isocyanate compound contained in the ink forming the mark reacts with and cures the base resin contained in the ink. At the same time, the isocyanate compound reacts with the epoxy group of the epoxy group-containing polymer contained in the cover material to form a bond therebetween. Thus, the adhesion between the printed mark and the cover surface is enhanced, resulting in the a mark hard to peel off.

In the present invention, the mark and the cover surface are preferably covered with a clear coat film. The clear coat film is formed by applying a clear paint over the entire cover surface so as to cover the mark. The clear coat film may be composed of a single layer or plural layers.

Any conventional clear paint can be used to form the clear topcoat film in the present invention. Specifically, a two-part curing type polyurethane paint comprising a combination of a polyol and a polyisocyanate is preferably used. The two-part curing type polyurethane paint may further contain a silicon type slip agent, leveling agent, viscosity modifier, fluorescent brightener, anti-blocking agent, curing catalyst and the like, in addition to the polyol and the polyisocyanate as a component forming polyurethane. There is no particular limitation on the clear paint coating process. It is possible to employ any conventional and known coating process such as spray coating, brushing, or a process using a paint gun.

EXAMPLES

The following examples illustrate the present invention, however these examples are intended to illustrate the invention and are not to be construed to limit the scope of the invention. Many variations and modifications of such examples will exist without departing from the scope of the inventions. Such variations and modifications are intended to be within the scope of the invention.

[Evaluation Method]

(1) Wear-resistance 500 golf balls for each type of the golf ball were launched in a golf practice shooting range to evaluate the wear resistance. Three months later, 12 golf balls of 500 for the each type were collected, and peeled areas of the clear coat film and the mark were measured. The result of the evaluation was rated on the following five levels in accordance with the proportion of the peeled area relative to the whole ball surface area. The average of 12 golf balls was regarded as the result of the wear resistance for the each type of the golf ball.

Rating Levels:

0: No peeled area;

1: The peeled area proportion is less than 20%;

2: The peeled area proportion is not less than 20% and less than 40%;

3: The peeled area proportion is not less than 40% and less than 60%;

4: The peeled area proportion is not less than 60% and less than 80%; and

5: The peeled area proportion of not less than 80%.

(2) Alkali-resistance 12 golf balls for the each type was immersed into a four-fold dilution of the cleaning agent for 50 minutes and then washed with water. The cleaning agent was commercially available under the name of "YOGORETOL" (pH= 13.7 to 14.0) from YOKOHAMA YUSHI KOGYO CO., LTD, which was used in the golf practice shooting range. The peeled area of the coating and the mark were measured. The result of the evaluation was rated on the following five levels in accordance with the proportion of the peeled area relative to the whole ball surface area. The average of 12 golf balls was regarded as the result of the Alkali resistance of the each type of the golf ball.

Rating Levels:

0: No peeled area;

1: The peeled area proportion is less than 20%;

2: The peeled area proportion is not less than 20% and less than 40%;

3: The peeled area proportion is not less than 40% and less than 60%;

4: The peeled area proportion is not less than 60% and less than 80%; and

5: The peeled area proportion of not less than 80%.

[Manufacture of Golf Ball]

A core composition shown in Table 1 was prepared and homogeneously kneaded. The composition thus kneaded was put into a mold and subjected to press molding at 144° C. for 20 minutes to form a core having a diameter of 38.5 mm.

TABLE 1

| Core composition | Amount (Parts by mass) |
| --- | --- |
| Butadiene rubber | 100 |
| Zinc oxide | 3 |
| Zinc acrylate | 25 |
| Barium Sulfate | 17.7 |

TABLE 1-continued

| Core composition | Amount (Parts by mass) |
|---|---|
| Titanium oxide | 1 |
| Dicumyl peroxide | 1.65 |

Butadiene rubber: BR 11, a high-cis polybutadiene rubber produced by JSR CO., LTD.

The obtained core was covered with each of the cover compositions shown in Table 2. The cover-forming composition was injection-molded over the surface of the core to form a cover. The surface of the cover was abraded, then a mark was printed on the cover surface with the ink by pad printing. The composition of the ink was also shown in Table 2. Thereafter, a two-part curing type of urethane clear paint was applied over the entire surface of the cover by using the spray-gun so as to cover the mark. In this way, golf balls Nos. 1 to 8 each having a diameter of 42.7 mm were manufactured. Golf balls Nos. 1 to 6 are the working examples of the present invention, where each of golf balls No. 1 to 6 has the cover formed from the cover material containing the epoxy group-containing polymer and the mark printed with the ink containing the nitrocellulose resin or the epoxy group containing resin. On the other hand, golf balls No. 7 to 8 are comparative examples.

In Table 2, HIMILAN 1557 is a zinc ion-neutralized ionomer resin produced by MITSUI-DUPONT POLYCHEMICAL CO., LTD.; HIMILAN 1707 is a sodium ion-neutralized ionomer resin produced by MITSUI-DUPONT POLYCHEMICAL CO., LTD.; and HIMILAN 1855 is a zinc ion-neutralized ionomer resin produced by MITSUI-DUPONT POLYCHEMICAL CO., LTD. EPOFRIEND A1010 produced. by DAICEL CHEMICAL INDUSTRIES, LTD was used as the epoxy group-containing polymer, which is an epoxidized thermoplastic elastomer. The epoxidized thermoplastic elastomer is a styrene type thermoplastic elastomer of the SBS structure having an epoxidized terminal. The epoxy equivalent weight of EPOFREIEND A1010 is from 950 to 1050, and the mixing ratio of butadiene/styrene in the thermoplastic elastomer is 60/40. As the solvent, a mixture of an aromatic hydrocarbon and methoxymethylbutyl acetate was used.

Golf balls Nos. 7 and 8 were inferior in both the wear resistance and alkali resistance of their marks, because golf ball No. 7 did not use the isocyanate curing agent for the ink and golf ball No. 8 did not use the epoxy group-containing polymer for the cover material. Since golf ball No. 8 did not use the epoxy group-containing polymer for the cover material, it was remarkably inferior in wear resistance.

As can be understood from the results of golf balls Nos. 1 to 3, the wear resistance and the alkali resistance of the mark tend to become higher as the content of the epoxy group-containing polymer in the cover material increases. Also, the results of golf balls Nos. 1 and 4 indicated that either of the nitrocellulose resin and the epoxy group-containing resin shows the similar effect on the wear resistance and the alkali resistance of the mark as the base resin contained in the ink. Further, the comparison between golf balls Nos. 5 and 6 indicated that the content of the isocyanate compound of the ink somewhat influences the wear resistance and the alkali resistance of the mark, because the content of the epoxy group-containing polymer in the cover material and the content of the nitrocellulose resin in the ink are constant.

The present invention provides the golf ball bearing a printed mark which exhibits the superior adhesion to the cover of the golf ball by employing the specific combination of the cover material and the ink. Therefore, the golf ball of the present invention is best for use in the golf practice shooting range where the golf ball is used under severe conditions; that is, the golf ball is repeatedly cleaned and hit.

In the present invention, since the adhesion of the mark to the cover is higher than the adhesion of the mark to the clear topcoat forming the surface layer of the golf ball, the mark remains as it is on the cover surface even if the clear topcoat peels off due to long-term use, and hence the golf ball of the present invention can keep on holding a value of use as a golf ball desired by the manufacturer. This application is based on Japanese Patent application No. 2001-268926 filed on Sep. 5, 2001, the contents of which are hereby incorporated by reference.

What is claimed is:

1. A golf ball comprising a core, a cover covering the core, and a mark printed on the surface of the cover, wherein the cover is formed from a mixture of an ionomer and an epoxy group-containing polymer; and

TABLE 2

| Golf ball | 1 | 2 | 3 | 4 | 5 | 6 | 7 | 8 |
|---|---|---|---|---|---|---|---|---|
| Cover composition(parts by mass) | — | — | — | — | — | — | — | — |
| Himilan 1557 | 24 | 28 | 21 | 24 | 24 | 24 | 24 | 30 |
| Himilan 1707 | 16 | 19 | 14 | 16 | 16 | 16 | 16 | 20 |
| Himilan 1855 | 40 | 48 | 35 | 40 | 40 | 40 | 40 | 50 |
| Epoxy group containing polymer | 20 | 5 | 30 | 20 | 20 | 20 | 20 | — |
| Titanium oxide | 2 | 2 | 2 | 2 | 2 | 2 | 2 | 2 |
| Ink composition(parts by mass) | — | — | — | — | — | — | — | — |
| Nitrocellulose resin[*1)] | 16.8 | 16.8 | 16.8 | — | 16.8 | 16.8 | 16.8 | 16.8 |
| Polyester polyol | 4.2 | 4.2 | 4.2 | — | 4.2 | 4.2 | 4.2 | 4.2 |
| Epoxy group containing resin | — | — | — | 21 | — | — | — | — |
| Pigment | 9 | 9 | 9 | 9 | 9 | 9 | 9 | 9 |
| Hexamethylene diisocyanate | 7 | 7 | 7 | 7 | 5 | 9 | — | 7 |
| Solvent | 49 | 49 | 49 | 49 | 49 | 49 | 49 | 49 |
| Flatting agent | 14 | 14 | 14 | 14 | 14 | 14 | 14 | 14 |
| Result | — | — | — | — | — | — | — | — |
| Wear resistance | 1.3 | 1.2 | 1.6 | 1.4 | 1.3 | 1.4 | 2.1 | 3.0 |
| Alkali resistance | 1.1 | 1.8 | 1.1 | 1.3 | 1.2 | 1.4 | 4.8 | 4.4 |

[*1)]Partially-nitrated type the mark is an ink which comprises
  a pigment,
  an isocyanate compound, and
  a base resin which includes at least one resin selected from the group consisting of an epoxy group-containing resin and a polyester resin containing at least one alcoholic hydroxyl group.

2. The golf ball according to claim 1, wherein the epoxy group-containing polymer is a thermoplastic elastomer with the epoxy group being provided at any position of a molecular chain thereof.

3. The golf ball according to claim 2, wherein the thermoplastic elastomer is a block copolymer comprising a polystyrene block and a polybutadiene block which are bonded to each other, wherein at least one double bond of the butadiene block is epoxidized or a hydrogenated product of the block copolymer.

4. The golf ball according to claim 1, wherein the epoxy group-containing polymer is a thermoplastic elastomer having a polybutadiene block or a polyisoprene block and at least one double bond of the polybutadiene block or the polyisoprene block is epoxidized.

5. The golf ball according to claim 1, wherein the epoxy group-containing polymer is a thermoplastic elastomer having a random copolymer block consisting of isoprene and butadiene and at least one double bond of the random copolymer block is epoxidized.

6. The golf ball according to claim 1, wherein the epoxy group-containing polymer is a thermoplastic elastomer having a structure of polystyrene block-polybutadiene block-polystyrene block and at least one double bond of the polybutadiene block is epoxydized.

7. The golf ball according to claim 1, wherein the epoxy group-containing polymer has an epoxy equivalent weight ranging from 500 to 3000.

8. The golf ball according to claim 1, wherein a ratio of the ionomer to the epoxy group-containing polymer in the mixture is from 95:5 to 70:30 by mass.

9. The golf ball according to claim 1, further comprising a clear topcoat film covering the mark and the cover.

10. The golf ball according to claim 1, wherein the ink comprises
  1 to 30 mass % of the pigment;
  1 to 30 mass % of the isocyanate compound; and
  40 to 98 mass % of the base resin.

11. The golf ball according to claim 1, wherein the ink further contains a solvent.

12. The golf ball according to claim 11, wherein the ink further contains a flatting agent.

13. The golf ball according to claim 12, wherein the ink comprises
  1 to 20 mass % of the pigment;
  1 to 20 mass % of the isocyanate compound;
  10 to 30 mass % of the base resin;
  40 to 70 mass % of the solvent; and
  1 to 30 mass % of the flatting agent so that the total mass % is 100%.

14. The golf ball according to claim 1, wherein the ink comprises a polyester polyol containing at least one alcoholic hydroxyl group as the base resin.

* * * * *